United States Patent
Leportier et al.

(10) Patent No.: US 11,668,931 B2
(45) Date of Patent: Jun. 6, 2023

(54) SYSTEMS, DEVICES, AND METHODS FOR EXIT PUPIL EXPANSION IN A CURVED LENS WITH EMBEDDED LIGHT GUIDE

(71) Applicant: GOOGLE LLC, Mountain View, CA (US)

(72) Inventors: Thibault Louis David Leportier, Kitchener (CA); Timothy Paul Bodiya, Toronto (CA)

(73) Assignee: GOOGLE LLC, Mountain View, CA (US)

( * ) Notice: Subject to any disclaimer, the term of this patent is extended or adjusted under 35 U.S.C. 154(b) by 721 days.

(21) Appl. No.: 16/574,452

(22) Filed: Sep. 18, 2019

(65) Prior Publication Data

US 2020/0088995 A1 Mar. 19, 2020

Related U.S. Application Data

(60) Provisional application No. 62/732,896, filed on Sep. 18, 2018.

(51) Int. Cl.
| | |
|---|---|
| *G02B 27/01* | (2006.01) |
| *G02B 27/00* | (2006.01) |
| *G02B 6/12* | (2006.01) |
| *G02B 6/28* | (2006.01) |
| *F21V 8/00* | (2006.01) |

(52) U.S. Cl.
CPC ....... *G02B 27/0081* (2013.01); *G02B 6/0028* (2013.01); *G02B 6/12* (2013.01); *G02B 6/2848* (2013.01); *G02B 27/0172* (2013.01); *G02B 2006/12102* (2013.01)

(58) Field of Classification Search
None
See application file for complete search history.

(56) References Cited

U.S. PATENT DOCUMENTS

| | | | |
|---|---|---|---|
| 10,578,876 B1 * | 3/2020 | Lam | G02F 1/3544 |
| 2016/0116680 A1 * | 4/2016 | Ling | G02B 6/305 |
| | | | 385/37 |
| 2018/0113313 A1 * | 4/2018 | Tekolste | G02B 5/1861 |

FOREIGN PATENT DOCUMENTS

| | | | | |
|---|---|---|---|---|
| CN | 101994996 A | * | 3/2011 | G02B 6/0035 |
| WO | WO-2007129783 A1 | * | 11/2007 | G02B 6/0061 |

* cited by examiner

*Primary Examiner* — Chris H Chu

(57) ABSTRACT

Systems, devices, and methods for for exit pupil expansion in a curved lens with embedded light guide are described. Exit pupil expansion in a curved lens may be achieved with a light guide comprising an outcoupler with minimized second order diffraction, where the outcoupler applies an optical power to outcoupled light.

20 Claims, 9 Drawing Sheets

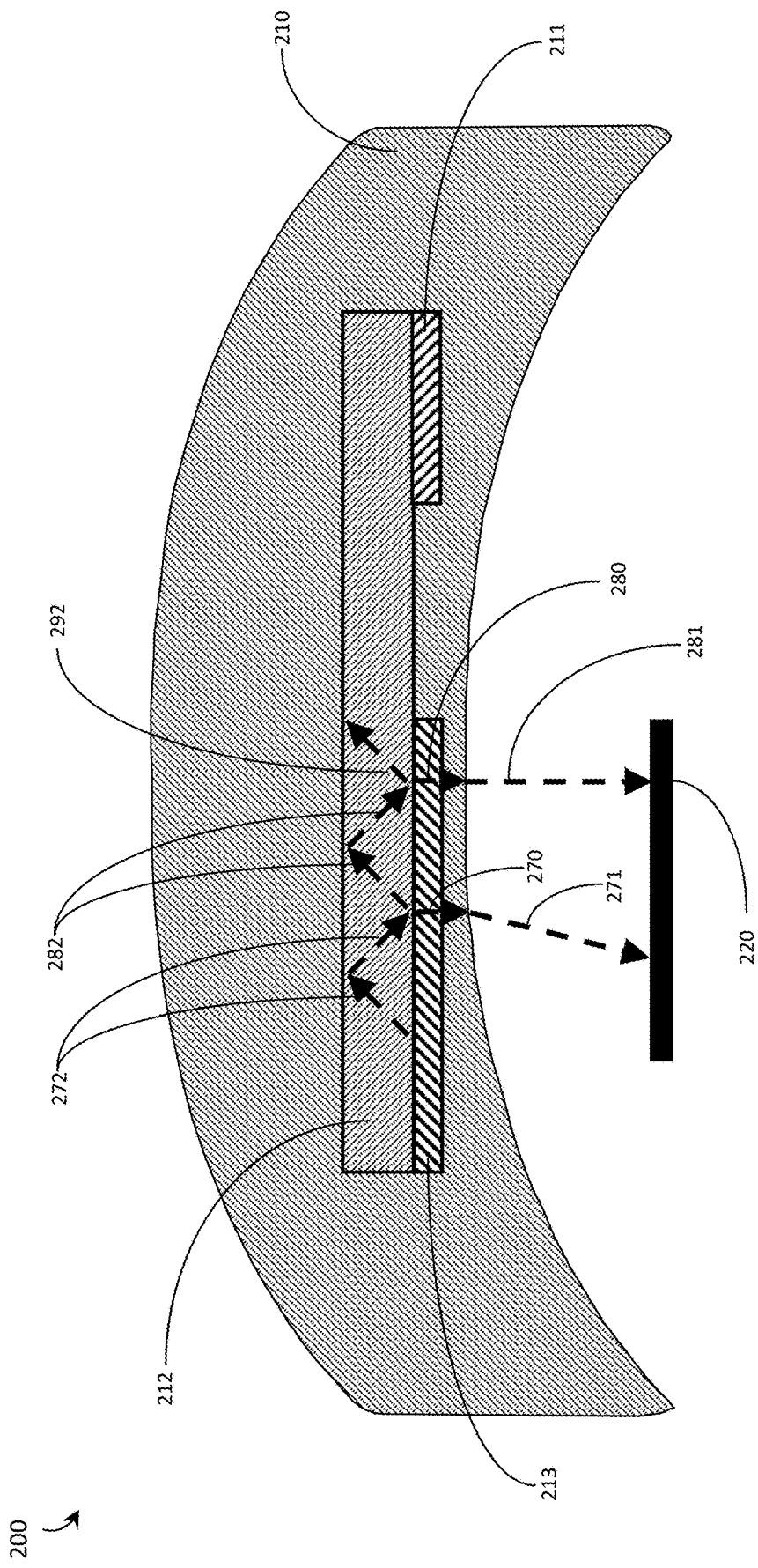

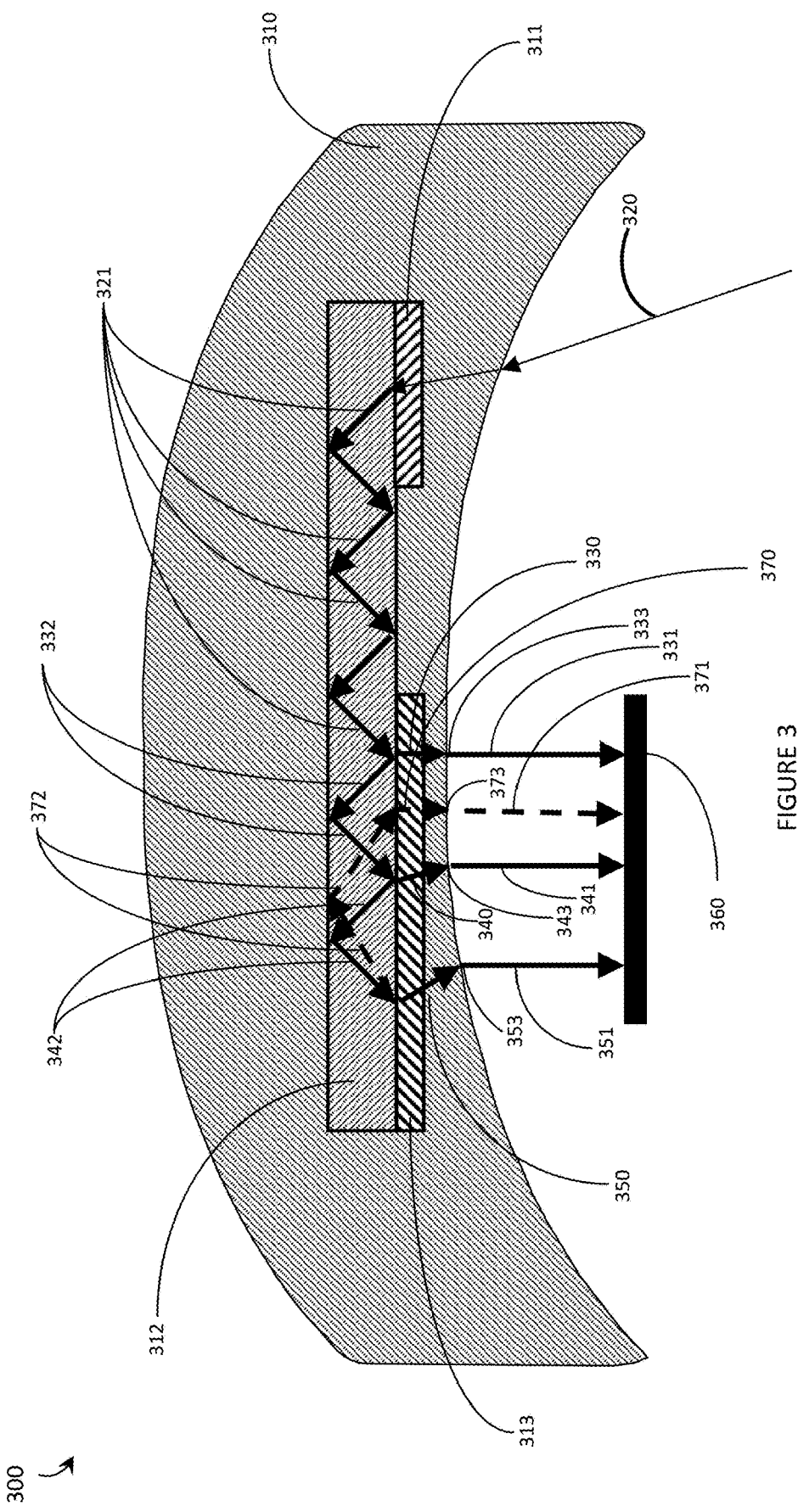

SYSTEMS, DEVICES, AND METHODS FOR EXIT PUPIL EXPANSION IN A CURVED LENS WITH EMBEDDED LIGHT GUIDE

TECHNICAL FIELD

The present systems, devices, and methods generally relate to laser projectors and particularly relate to focusing the laser light output by laser projectors.

BACKGROUND

Description of the Related Art

Wearable Heads-Up Displays

A head-mounted display is an electronic device that is worn on a user's head and, when so worn, secures at least one electronic display within a viewable field of at least one of the user's eyes, regardless of the position or orientation of the user's head. A wearable heads-up display is a head-mounted display that enables the user to see displayed content but also does not prevent the user from being able to see their external environment. The "display" component of a wearable heads-up display is either transparent or at a periphery of the user's field of view so that it does not completely block the user from being able to see their external environment. Examples of wearable heads-up displays include: the Google Glass®, the Optinvent Ora®, the Epson Moverio®, and the Sony Glasstron®, just to name a few.

The optical performance of a wearable heads-up display is an important factor in its design. When it comes to face-worn devices, however, users also care a lot about aesthetics. This is clearly highlighted by the immensity of the eyeglass (including sunglass) frame industry. Independent of their performance limitations, many of the aforementioned examples of wearable heads-up displays have struggled to find traction in consumer markets because, at least in part, they lack fashion appeal. Most wearable heads-up displays presented to date employ large display components and, as a result, most wearable heads-up displays presented to date are considerably bulkier and less stylish than conventional eyeglass frames.

A challenge in the design of wearable heads-up displays is to minimize the bulk of the face-worn apparatus will still providing displayed content with sufficient visual quality. There is a need in the art for wearable heads-up displays of more aesthetically-appealing design that are capable of providing high-quality images to the user without limiting the user's ability to see their external environment.

BRIEF SUMMARY

Systems, devices, and methods for eyebox expansion in wearable heads-up displays. Includes minimizing second order diffraction by an outcoupler in a light guide.

A surface relief grating-based outcoupler may be summarized as including: a set of ridges having: a grating period; a duty cycle; and a modulation height, wherein the duty cycle and the modulation height are both selected to provide: a second order diffraction efficiency for the outcoupler that is less than or equal to a first target value; and a first order diffraction efficiency for the outcoupler that is sub-maximal and greater than or equal to a second target value. The grating period may be selected to minimize a variation of a diffraction efficiency of the outcoupler as a function of wavelength. The grating period may be greater than or equal to half of a longest wavelength of light to be outcoupled by the outcoupler, and wherein the grating period may be less than or equal to two times a shortest wavelength of light to be outcoupled by the outcoupler.

The first target value may be a minimum value for the second order diffraction efficiency of the outcoupler, and the duty cycle and the modulation height may both be selected to provide a second order diffraction efficiency for the outcoupler that is equal to the first target value.

The outcoupler may be operative to outcouple a red wavelength of light, a green wavelength of light, and a blue wavelength of light, and the duty cycle and the modulation height may both be selected to provide: a second order diffraction efficiency for the outcoupler that is less than or equal to the first target value for each of the red wavelength of light, the green wavelength of light, and the blue wavelength of light; and a first order diffraction efficiency for the outcoupler that is sub-maximal and greater than or equal to the second target value for each of the red wavelength of light, the green wavelength of light, and the blue wavelength of light. The red wavelength of light may be about 640 nm, the green wavelength of light may be about 520 nm, and the blue wavelength of light may be about 450 nm. The grating period may be in a range of 320 nm-900 nm. The duty cycle may be in a range selected from a group consisting of: 15%-30% and 65%-95%. The modulation height may be in a range of 20 nm-100 nm. The grating period may be in a range of 320 nm to 450 nm. The duty cycle may be in a range of 67%-77%. The modulation height may be in a range of 50 nm-100 nm.

The outcoupler may be operative to provide an optical power to light outcoupled thereby, the optical power to compensate for a curvature of an eye-side surface of a lens into which the outcoupler is to be embedded.

A lightguide may be summarized as including: a volume of optically transparent material; an incoupler carried by the volume of optically transparent material; and an outcoupler carried by the volume of optically transparent material, wherein the outcoupler comprises: a set of ridges having: a grating period; a duty cycle; and a modulation height, wherein the duty cycle and the modulation height are both selected to provide: a second order diffraction efficiency for the outcoupler that is less than or equal to a first target value; and a first order diffraction efficiency for the outcoupler that is sub-maximal and greater than or equal to a second target value. The grating period may be selected to minimize a variation of a diffraction efficiency of the outcoupler as a function of wavelength. The first target value may be a minimum value for the second order diffraction efficiency of the outcoupler, and the duty cycle and the modulation height may both be selected to provide a second order diffraction efficiency for the outcoupler that is equal to the first target value.

The outcoupler of the lightguide may be operative to outcouple a red wavelength of light, a green wavelength of light, and a blue wavelength of light, and the duty cycle and the modulation height may both be selected to provide: a second order diffraction efficiency for the outcoupler that is less than or equal to the first target value for each of the red wavelength of light, the green wavelength of light, and the blue wavelength of light; and a first order diffraction efficiency for the outcoupler that is sub-maximal and greater than or equal to the second target value for each of the red wavelength of light, the green wavelength of light, and the blue wavelength of light. The red wavelength of light may be about 640 nm, the green wavelength of light may be about 520 nm, and the blue wavelength of light may be about 450 nm. The grating period may be in a range of 320 nm-900 nm. The duty cycle may be in a range selected from a group consisting of: 15%-30% and 65%-95%. The modulation height may be in a range of 20 nm-100 nm.

The outcoupler of the lightguide may be operative to provide an optical power to light outcoupled thereby, the optical power to compensate for a curvature of an eye-side surface of a lens into which the lightguide is to be embedded.

An eyeglass lens may be summarized as including: a curved lens; and a lightguide embedded in the curved lens, wherein the lightguide comprises: a volume of optically transparent material; an incoupler carried by the volume of optically transparent material; and an outcoupler carried by the volume of optically transparent material, wherein the outcoupler comprises: a set of ridges having: a grating period; a duty cycle; and a modulation height, wherein the duty cycle and the modulation height are both selected to provide: a second order diffraction efficiency for the outcoupler that is less than or equal to a first target value; and a first order diffraction efficiency for the outcoupler that is sub-maximal and greater than or equal to a second target value. The grating period may be selected to minimize a variation of a diffraction efficiency of the outcoupler as a function of wavelength. The first target value may be a minimum value for the second order diffraction efficiency of the outcoupler, and the duty cycle and the modulation height may both be selected to provide a second order diffraction efficiency for the outcoupler that is equal to the first target value.

The outcoupler of the lightguide of the eyeglass lens may be operative to outcouple a red wavelength of light, a green wavelength of light, and a blue wavelength of light, and the duty cycle and the modulation height may both be selected to provide: a second order diffraction efficiency for the outcoupler that is less than or equal to the first target value for each of the red wavelength of light, the green wavelength of light, and the blue wavelength of light; and a first order diffraction efficiency for the outcoupler that is sub-maximal and greater than or equal to the second target value for each of the red wavelength of light, the green wavelength of light, and the blue wavelength of light. The red wavelength of light may be about 640 nm; the green wavelength of light may be about 520 nm, and the blue wavelength of light may be about 450 nm. The grating period may be in a range of 320 nm-900 nm. The duty cycle may be in a range selected from a group consisting of: 15%-30% and 65%-95%. The modulation height may be in a range of 20 nm-100 nm.

The curved lens of the eyeglass lens may include an eye-side surface having a first curvature, and the outcoupler of the lightguide of the eyeglass lens may operative to provide an optical power to light outcoupled thereby, the optical power to compensate for the curvature of the eye-side surface of the curved lens.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 2B is a cross-sectional view of a curved lens with embedded lightguide.

FIG. 3 is a cross-sectional view of a curved lens with embedded lightguide in accordance with the present systems, devices, and methods.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with portable electronic devices and head-worn devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, devices, and methods for exit pupil expansion in a curved lens with embedded light guide and are particularly well-suited for use in wearable heads-up displays (WHUDs).

Figure 1:
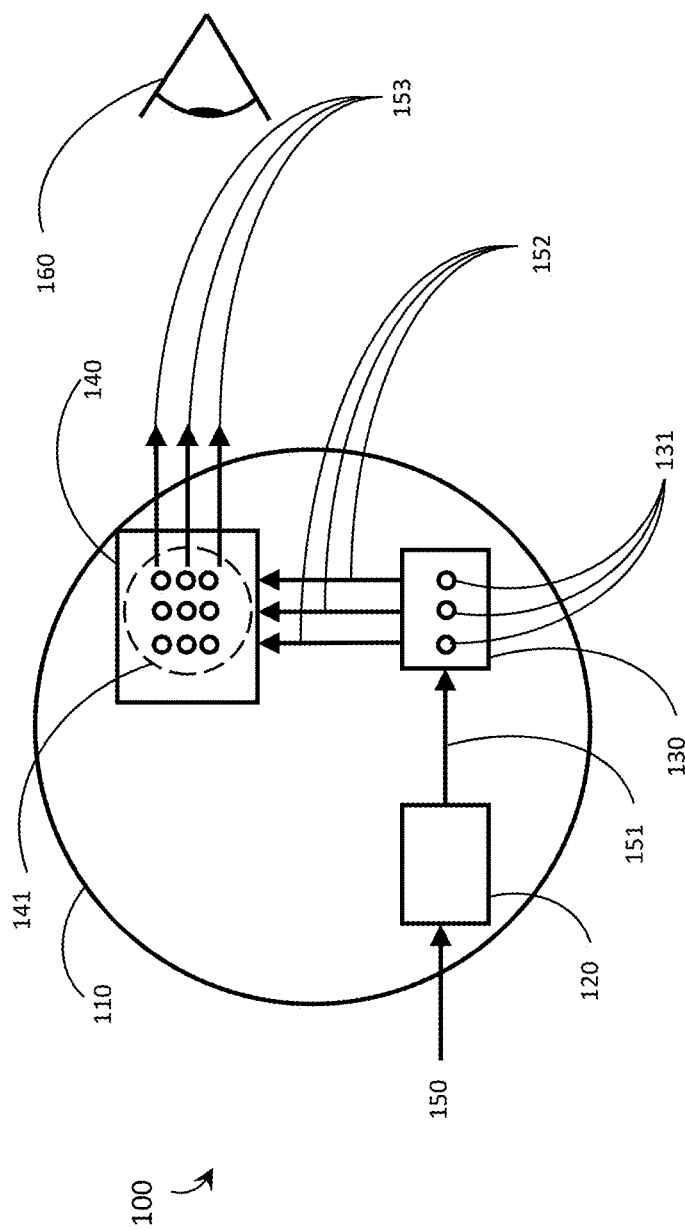
FIG. 1 is a front elevational view of an exemplary curved lens with embedded lightguide suitable for use in a wearable heads-up display in accordance with the present systems, devices, and methods.

FIG. 1 is a front elevational view of an exemplary curved lens with embedded light guide 100 suitable for use in a WHUD in accordance with the present systems, devices, and methods. Curved lens with embedded light guide 100 comprises curved lens 110 with a lightguide integrated therein, the lightguide comprising a volume of optically transparent material (not separately visible in FIG. 1) that carries incoupler 120, exit pupil expander 130, and outcoupler 140.

Incoupler 120 comprises a diffractive element that diffracts incident light 150 into the lightguide of curved lens 110, converting incident light 150 into guided light 151. Incident light 150 and guided light 151 each comprise at least one exit pupil. The lightguide within curved lens 110 routes guided light 151 to exit pupil expander 130. Exit pupil expander 130 comprises a first exit pupil replicator. Exit pupil expander 130 replicates the at least one exit pupil of guided light 151 to form first set of exit pupils 131. First set of exit pupils 131 comprises at least one first sub-set of exit pupils, wherein each first sub-set of exit pupils is oriented in a first dimension. Exit pupil expander 130 also redirects first set of exit pupils 131 within the lightguide of curved lens 110. The lightguide of curved lens 110 routes first set of exit pupils 131 to outcoupler 140.

Outcoupler 140 comprises a second exit pupil expander. Outcoupler 140 replicates first set of exit pupils 131 to form second set of exit pupils 141. Second set of exit pupils 141 comprises at least one second sub-set of exit pupils, wherein each second sub-set of exit pupils is oriented in a second dimension. In the illustrated implementation, outcoupler 140 comprises a holographic outcoupler. Outcoupler 140 outcouples each exit pupil comprising second set of exit pupils 141 as out-coupled light 153 propagating towards target area 160.

Figure 2A:
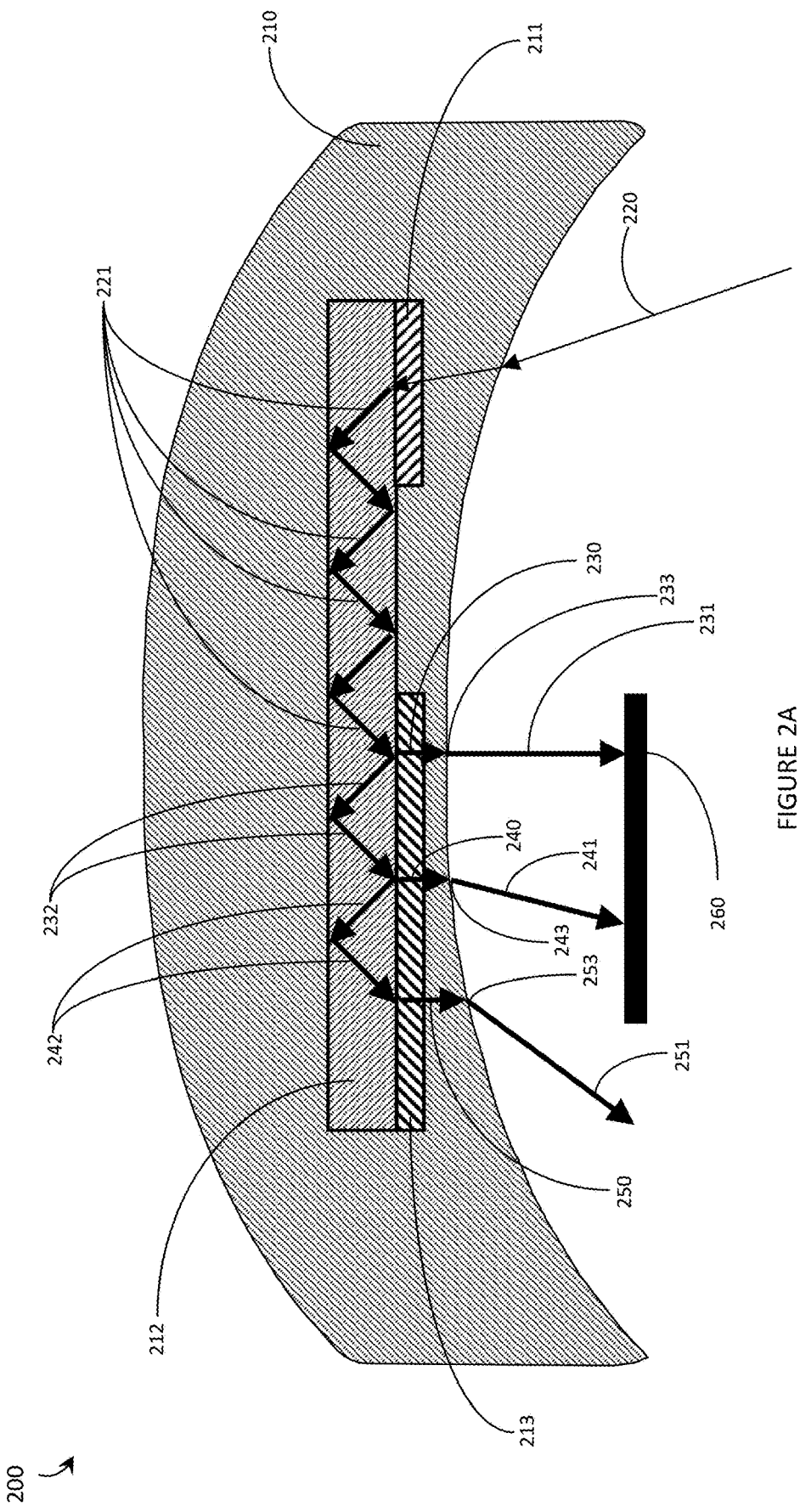
FIG. 2A is a cross-sectional view of a curved lens with embedded lightguide.

FIG. 2A is a cross-sectional view of a curved lens with embedded light guide 200. Curved lens with embedded light guide 200 comprises curved lens 210, incoupler 211, light guide 212 (e.g., a volume of optically transparent material), and outcoupler 213. Exit pupil replication (such as by exit pupil expander 130 from FIG. 1) is not illustrated in FIG. 2A to reduce clutter. Incident light 220 impinges on curved lens 210, is refracted at the interface between the air and curved lens 210, and impinges on incoupler 211 which couples at least a portion thereof into light guide 212 to form guided light 221. Guided light 221 propagates through light guide 212 via total internal reflection (TIR) to impinge on outcoupler 213.

Outcoupler 213 comprises a diffractive element with no optical power. Outcoupler 213 may comprise a surface relief grating (SRG). Outcoupler 213 may comprise a hologram, where the thickness of the hologram may be less than 25 um, less than 10 um, or less than 5 um, where a thinner hologram typically has a higher efficiency second order diffraction.

Outcoupler 213 couples a portion of guided light 221 out of lightguide 212 to form first exit pupil 230; the remainder of guided light 221 totally-internally reflects within lightguide 212 to form first propagating light 232. First exit pupil 230 impinges on the interface between the air and curved lens 210 at first interface location 233 to form first refracted exit pupil 231 which impinges on target 260. Target 260 may comprise an eye of a user; target 260 may comprise a camera.

First propagating light 232 impinges on outcoupler 213. Outcoupler 213 couples a portion of first propagating light 232 out of lightguide 212 to form second exit pupil 240; the remainder of first propagating light 232 totally-internally reflects within lightguide 212 to form second propagating light 242. Second exit pupil 240 impinges on the interface between the air and curved lens 210 at second interface location 243 to form second refracted exit pupil 241 which may impinge on target 260; due to the difference in curvature of curved lens 210 between first interface location 233 and second interface location 243, first refracted exit pupil 231 and second refracted exit pupil 241 do not exit lens 210 at the same angle.

Second propagating light 242 impinges on outcoupler 213. Outcoupler 213 couples a portion of second propagating light 242 out of lightguide 212 to form third exit pupil 250. A person of skill in the art will appreciate that remaining portions of light not outcoupled by outcoupler 213 could continue to propagate through lightguide 212, with respective portions of said remaining portions of light being outcoupled by outcoupler 213 to form additional exit pupils. Third exit pupil 250 impinges on the interface between the air and curved lens 210 at third interface location 253 to form third refracted exit pupil 251 which may or may not impinge on target 260; due to the difference in curvature of curved lens 211 between first interface location 233, second interface location 243, and third interface location 253, third exit pupil 251 does not exit curved lens 211 at the same angle as first refracted exit pupil 231 or second refracted exit pupil 241. In accordance with the present systems, devices, and methods, first refracted exit pupil 231, second refracted exit pupil 241, and third refracted exit pupil 251 could exit curved lens 211 with the same angle if outcoupler 213 applied an optical power to at least first propagating light 232 and second propagating light 242.

The process of outcoupling a portion of light impinging on outcoupler 213 to form an exit pupil (e.g. first exit pupil 230, second exit pupil 240, and third exit pupil 250) occurs, at least in part, due to first order diffraction of light by outcoupler 213. Outcoupler 213 comprises a diffractive element, therefore outcoupler 213 has a second order diffraction, where the second order diffraction is in the opposite direction to the light impinging on outcoupler 213 due to the lack of optical power present in outcoupler 213. The first order diffraction has a first diffraction efficiency (first order DE), where the first order DE is the amount of light diffracted in the first order direction relative to the total amount of light impinging on outcoupler 213 (typically expressed as a percentage). The second order DE is the amount of light diffracted in the second order direction relative to the total amount of light impinging on outcoupler 213 (typically expressed as a percentage).

FIG. 2B is another cross-sectional view of curved lens with embedded light guide 200 from FIG. 2A. Incident light 220, guided light 221, first exit pupil 230, first refracted exit pupil 231, first propagating light 232, second exit pupil 240, second refracted exit pupil 241, second propagating light 242, third exit pupil 250, and third refracted exit pupil 251 have all been omitted from FIG. 2B to reduce clutter.

The incidence of second propagating light 242 (see FIG. 2A, not shown in FIG. 2B to reduce clutter) on outcoupler 213 creates initial second order light 272. Initial second order light 272 propagates in a direction opposite to second propagating light 242. Initial second order light 272 totally internally reflects within lightguide 212 to impinge on outcoupler 213. Outcoupler 213 couples a portion of initial second order light 272 out of lightguide 212 to form fourth exit pupil 270; the remainder of initial second order light 272 totally internally reflects within lightguide 212 to form secondary second order light 282. Fourth exit pupil 270 impinges on the interface between the air and curved lens 210 to form fourth refracted exit pupil 271 which may impinge on target 260. Initial second order light 272 may have the same angle as first propagating light 232 and guided light 221 and may therefore impinge on outcoupler 213 at the same locations on outcoupler 213 as first propagating light 232 and guided light 221.

Secondary second order light 282 totally internally reflects within lightguide 212 to impinge on outcoupler 213. Outcoupler 213 couples a portion of secondary second order light 282 out of lightguide 212 to form fifth exit pupil 280; the remainder of secondary second order light 282 totally internally reflects within lightguide 212 to form tertiary second order light 292. Fifth exit pupil 280 impinges on the interface between the air and curved lens 210 to form fifth refracted exit pupil 281 which may impinge on target 260.

A person of skill in the art will appreciate that remaining portions of second order light not outcoupled by outcoupler 213 could continue to propagate through lightguide 212, with respective portions of said remaining portions of second order light being outcoupled by outcoupler 213 to form additional exit pupils Each portion of initial second order light 272 outcoupled by outcoupler 213 may overlap with another exit pupil (e.g. first exit pupil 230, second exit pupil 240, etc.) that is outcoupled by outcoupler 213 to impinge on target 260, therefore initial second order light 272 may, in some implementations, not be readily observed or distinguished from first order light outcoupled by outcoupler 213.

FIG. 3 is a cross-sectional view of a curved lens with embedded light guide 300 in accordance with the present systems, devices, and methods. Curved lens with embedded light guide 300 comprises curved lens 310, incoupler 311, light guide 312, and outcoupler 313. Exit pupil replication (such as by exit pupil expander 130 from FIG. 1) is not shown in FIG. 3 to reduce clutter. Incident light 320 impinges on curved lens 310, is refracted at the interface between the air and curved lens 310, and then impinges on incoupler 311 which couples at least a portion of incident light 320 into light guide 312 to form guided light 321. Guided light 321 propagates through light guide 312 via TIR. Guided light 321 impinges on outcoupler 313.

In accordance with the present systems, devices, and methods, outcoupler 313 comprises a diffractive element with a first optical power. Outcoupler 313 couples a portion of guided light 321 out of lightguide 312 to form first exit pupil 330; the remainder of guided light 321 is totally internally reflected within lightguide 312 to form first propagating light 332. First exit pupil 330 impinges on the interface between the air and curved lens 310 at first interface location 333 to form first refracted exit pupil 331 which exits curved lens 311 at a first angle to impinge on target 360. Target 360 may comprise an eye of a user; target 360 may comprise a camera.

First propagating light 332 impinges on outcoupler 313. Outcoupler 313 couples a portion of first propagating light 332 out of lightguide 312 to form second exit pupil 340; the remainder of first propagating light 332 is totally-internally reflected within lightguide 312 to form second propagating light 342. Second exit pupil 340 impinges on the interface between the air and curved lens 310 at second interface location 343 to form second refracted exit pupil 341 which impinges on target 360; the difference in curvature of curved lens 311 between first interface location 333 and second interface location 343 is compensated for by the optical power present in outcoupler 313 so that first refracted exit pupil 331 and second refracted exit pupil 341 exit curved lens 311 at substantially the same angle (i.e., within +/−10%).

Second propagating light 342 impinges on outcoupler 313. Outcoupler 313 couples a portion of second propagating light 342 out of lightguide 312 to form third exit pupil 350. A person of skill in the art will appreciate that remaining portions of light not outcoupled by outcoupler 313 could continue to propagate through light guide 312, with a respective portion of said remaining portions of light being outcoupled by outcoupler 313 to form additional exit pupils. Third exit pupil 350 impinges on the interface between the air and curved lens 310 at third interface location 353 to form third refracted exit pupil 351 which impinges on target 360; the difference in curvature of curved lens 311 between first interface location 333, second interface location 343, and third interface location 353, is compensated for by the optical power present in outcoupler 313 so that third exit pupil 251 exits curved lens 311 at the same angle as first refracted exit pupil 231 and second refracted exit pupil 241.

The process of outcoupling a portion of light impinging on outcoupler 313 to form an exit pupil gives rise to second order diffraction similar in some ways to the second order diffraction discussed in the description of FIG. 2B. Second order diffraction of second propagating light 342 creates initial second order light 372. Initial second order light 372 propagates through light guide 312 in a direction opposite to second propagating light 342 (as well as first propagating light 332 and guided light 321). Initial second order light 372 impinges on outcoupler 313 and outcoupler 313 outcouples a portion of initial second order light 372 out of lightguide 312 to form first second order exit pupil 370. First second order exit pupil 370 impinges on the interface between the air and curved lens 310 at fourth interface location 373 to form refracted second order exit pupil 371 which impinges on target 360.

The angle at which initial second order light 372 propagates through light guide 312 is not equal to the angle at which second propagating light 342 impinges on outcoupler 312 due to the optical power of outcoupler 313, therefore fourth interface location 373 may not overlap with first interface location 333, second interface location 343, and/or third interface location 353. Refracted second order exit pupil 371 may impinge on target 360 at a location that may not overlap with any other exit pupil, therefore refracted second order exit pupil 371 may be readily observable and distinguishable from any exit pupils arising from first order diffraction of light by outcoupler 313. Additional, non-overlapping exit pupils arising from second order diffraction may be referred to as ghost images. Ghost images may cause a degradation in display quality when a curved lens with embedded light guide is employed as a part of a WHUD.

A person of skill in the art will appreciate that each exit pupil outcoupled by outcoupler 313 via first order diffraction may also give rise to second order light that may propagate through light guide 312 to create multiple second order exit pupils, therefore second order diffraction may create a significant number of ghost images unless the efficiency of second order diffraction by outcoupler 313 is very low compared to the efficiency of first order diffraction by outcoupler 313. The efficiency of first order and second order diffraction by outcoupler 313 may be controlled by controlling the physical structures comprising outcoupler 313. If outcoupler 313 comprises a hologram the physical structures of outcoupler 313 may be controlled via control over the conditions/parameters used to record said hologram. If outcoupler 313 comprises a SRG (surface relief grating), the physical structures of outcoupler 313 may be controlled during grating fabrication.

The optical path shown in FIG. 3 depicts curved lens 310 with a concave surface between outcoupler 313 and target 360, therefore outcoupler 313 may have a positive optical power to compensate for the negative optical power applied to light exiting curved lens 310 via said concave surface. A person of skill in the art will appreciate that the surface between outcoupler 313 and target 360 may be convex, or may possess prescription curvature, in which case outcoupler 313 may have a negative or a more complex optical power, respectively, to compensate for the optical power applied by the curvature of curved lens 310.

Figure 4:
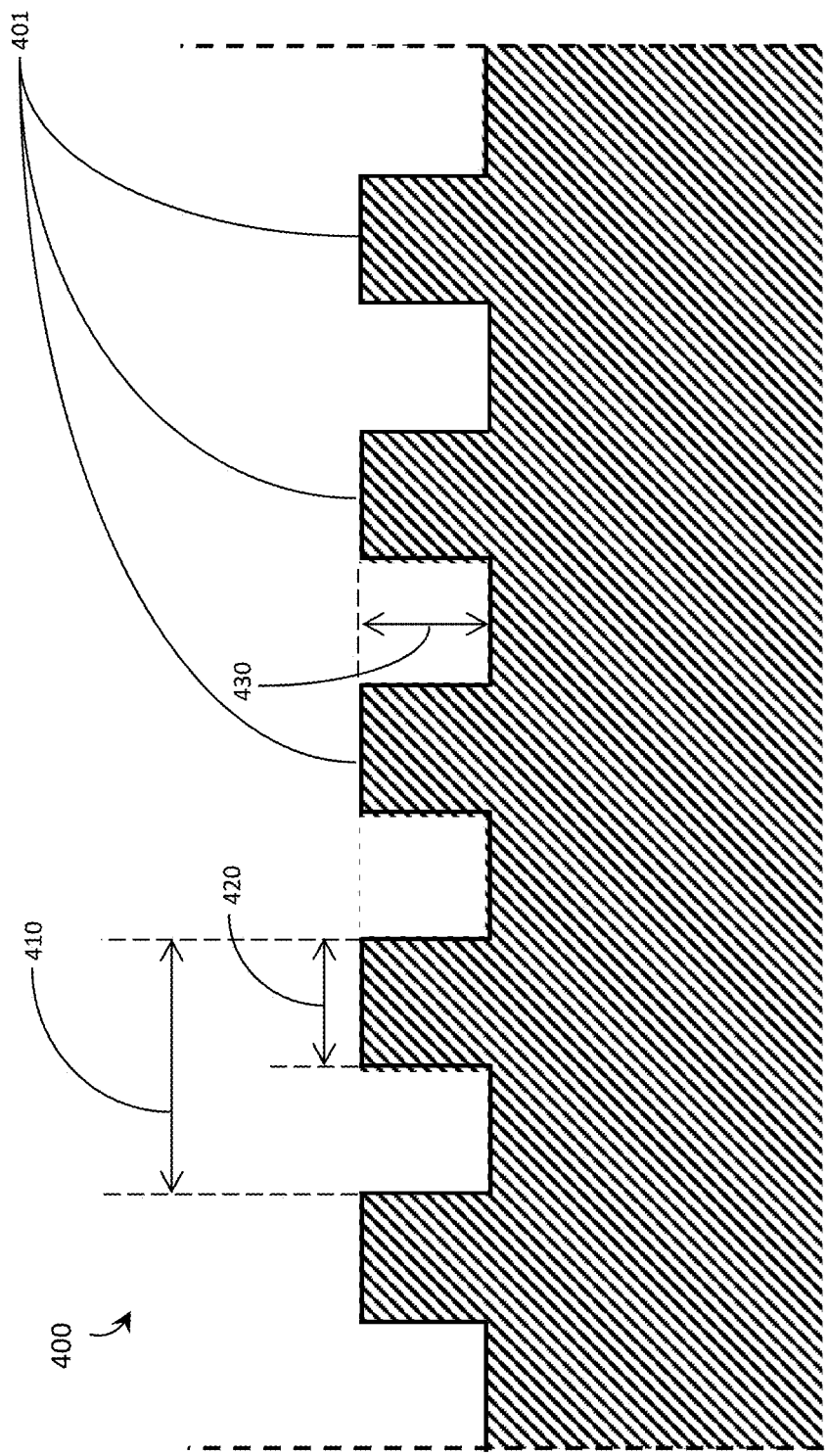
FIG. 4 is a is a cross-sectional view of a portion of a SRG outcoupler in accordance with the present systems, devices, and methods.

FIG. 4 is a is a cross-sectional view of a portion of a SRG outcoupler 400. SRG outcoupler 400 comprises set of ridges 401, wherein set of ridges 401 comprises a grating period 410, a duty cycle 420, and a modulation height 430. Set of ridges 401 comprises material of a first refractive index, the space between each ridge comprising set of ridges 401 comprises a second material with a second refractive index; the second material may be air.

Grating period 410 comprises the distance between one edge of a given ridge and same edge of the immediately adjacent ridge; grating period 410 may be constant throughout SRG outcoupler 400 or grating period 410 may vary across SRG outcoupler 400. Duty cycle 420 comprises the fraction of the surface of SRG outcoupler 400 made up of ridges and is typically expressed as a percentage; when duty cycle 420 is high there are very small gaps between each ridge comprising set of ridges 401 and when duty cycle 420 is low there are very large gaps between each ridge comprising set of ridges 401. Modulation height 430 comprises the height of the ridges comprising set of ridges 401. The efficiency of the first order diffraction efficiency of SRG outcoupler 400 varies as grating period 410, duty cycle 420, and modulation height 430 vary. The efficiency of the second order diffraction efficiency of SRG outcoupler 400 varies as grating period 410, duty cycle 420, and modulation height 430 vary. A typical SRG is fabricated with values for grating period 410, duty cycle 420, and modulation height 430 which achieve maximum efficiency for first order diffraction, however said values for grating period 410, duty cycle 420, and modulation height 430 may also cause unacceptably high second order diffraction efficiency. Therefore, in the present systems, devices, and methods, values for grating period 410, duty cycle 420, and modulation height 430 for SRG outcouplers are chosen not to maximize first order DE, but to achieve a desired minimum first order DE while minimizing second order DE. Additionally, it is desirable to vary first order DE across SRG outcoupler to achieve a constant intensity of the light comprising each EP outcoupled by a SRG outcoupler.

When a SRG outcoupler is part of a light guide assembly (e.g. if a SRG outcoupler comprises outcoupler 313 in curved lens with embedded light guide 300), the intensity of an EP outcoupled by outcoupler 313 at a given location on outcoupler 313 may depend on the first order DE and the intensity of light at said location on outcoupler 313. The intensity of light decreases as a function of propagation distance along outcoupler 313 due to the outcoupling of a portion of the propagating light with each impingement of said light on outcoupler 313; if first order DE is constant across outcoupler 313 then the intensity of light outcoupled by outcoupler 313 will decrease as a function of propagation distance. The intensity of light in EPs outcoupled by outcoupler 313 may be held constant if first order DE increases as a function of propagation distance along outcoupler 313. As constant EP intensity is a desirable property for WHUDs, it is desirable to have the first order DE increase as a function of propagation distance for outcoupler 313. In accordance with the present systems, devices, and methods, the first order DE may be increased as a function of propagation distance by varying duty cycle 420 and modulation height 430 as a function of propagation distance.

Figure 5B:
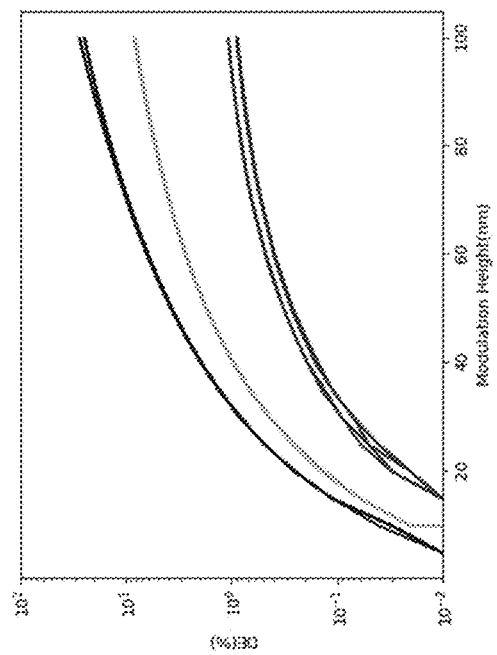
FIG. 5B is a second graph of data obtained for SRG outcouplers substantively similar to the SRG outcoupler from FIG. 4.
Figure 5A:
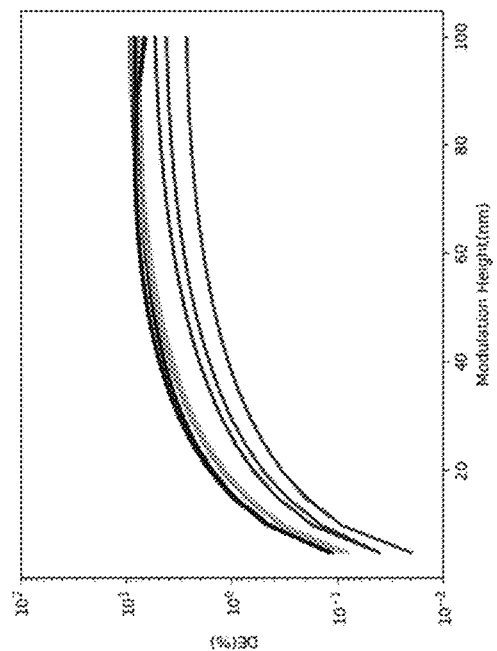
FIG. 5A is a first graph of data obtained for SRG outcouplers substantively similar to the SRG outcoupler from FIG. 4.

FIG. 5A is a first graph of data obtained for SRG outcouplers, such as SRG outcouplers having similar form (but various geometric/parametric properties) to SRG outcoupler 400 of FIG. 4. FIG. 5A shows the first order diffraction efficiency (in %) on the Y axis as a function of modulation height in nanometers (nm) on the X axis. FIG. 5A shows that first order diffraction efficiency increases dramatically from 5-40 nm, with much less of an increase in first order DE (and even a potential decrease in first order DE) above 40 nm. FIG. 5A depicts multiple lines, with each line corresponding to a different wavelength and incident angle on the SRG.

FIG. 5B is a second graph of data obtained for SRG outcouplers. FIG. 5B shows the second order diffraction efficiency (in %) on the Y axis as a function of modulation height in nanometers (nm) on the X axis. FIG. 5B shows that second order diffraction efficiency increases dramatically from 5-60 nm, with a continuous, albeit less extreme, increase in second order DE above 60 nm. FIG. 5B depicts multiple lines, with each line corresponding to a different wavelength and incident angle on the SRG. Comparing FIG. 5B to FIG. 5A, a person of skill in the art will appreciate that there are ranges of modulation height for which the first order DE is significantly higher than the second order DE, and vice versa.

Figure 6B:
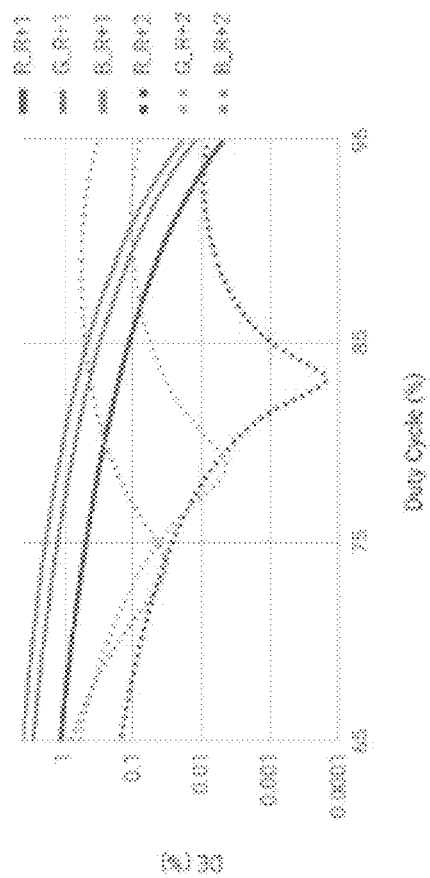
FIG. 6B is a fourth graph of data obtained for SRG outcouplers substantively similar to the SRG outcoupler from FIG. 4.
Figure 6A:
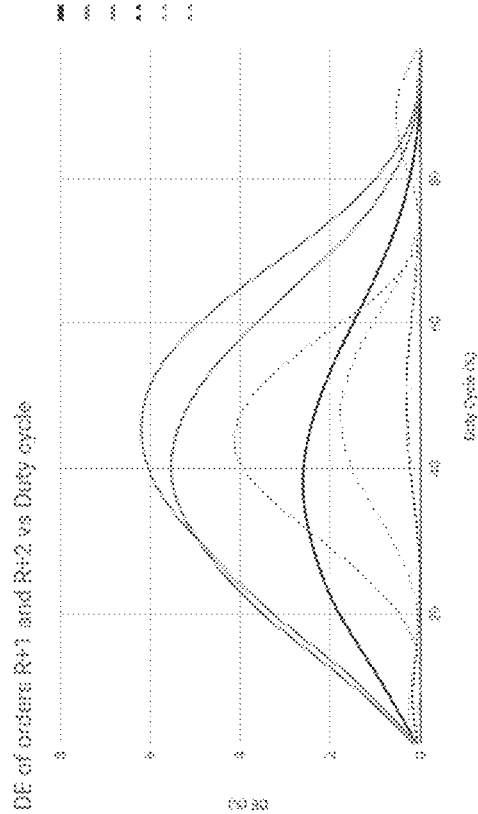
FIG. 6A is a third graph of data obtained for SRG outcouplers substantively similar to the SRG outcoupler from FIG. 4.

FIG. 6A is a third graph of data obtained for SRG outcouplers. FIG. 6A shows the diffraction efficiency (in %) on the Y axis as a function of duty cycle (in %) on the X axis. First order diffraction efficiency is depicted as solid lines while second order diffraction efficiency is depicted as dashed lines, where each diffraction order is depicted for red (R), green (G), and blue (B), wavelengths of light.

FIG. 6A shows that first order DE is greatest at duty cycles near 40%, varying with wavelength, and that first order DE decreases continuously at duty cycles greater than, or less than, near 40%. FIG. 6A shows that second order DE is greatest at a duty cycle between 40 and 60%, varying with wavelength, however second order DE does not decrease continuously as duty cycle increases or decreases from the 40-60% range. Second order DE reaches respective minima at 15-30% and at 65-85% before increasing again as a function of distance from the maximum. In accordance with the present systems, devices, and methods, there exist values for duty cycle at which second order DE may be minimized without simultaneously minimizing first order DE.

FIG. 6B is a fourth graph of data obtained for SRG outcouplers, focusing on the minimum in the 65-85% duty cycle range. FIG. 6B shows the diffraction efficiency (in %) on the Y axis as a function of duty cycle (in %) on the X axis. First order diffraction efficiency is depicted as solid lines while second order diffraction efficiency is depicted as dashed lines, where each diffraction order is depicted for red (R), green (G), and blue (B), wavelengths of light. FIG. 6B depicts data substantively similar to the data depicted in FIG. 6A, with the range of values of duty cycle limited to 65-95% and with DE depicted on a logarithmic scale.

FIG. 6B shows that the minimum value of second order DE may depend on wavelength, and that a duty cycle value of approximately 75% minimizes second order diffraction efficiency for red, green, and blue light while keeping first order diffraction efficiency for red, green, and blue light well above minimum.

Figure 6C:
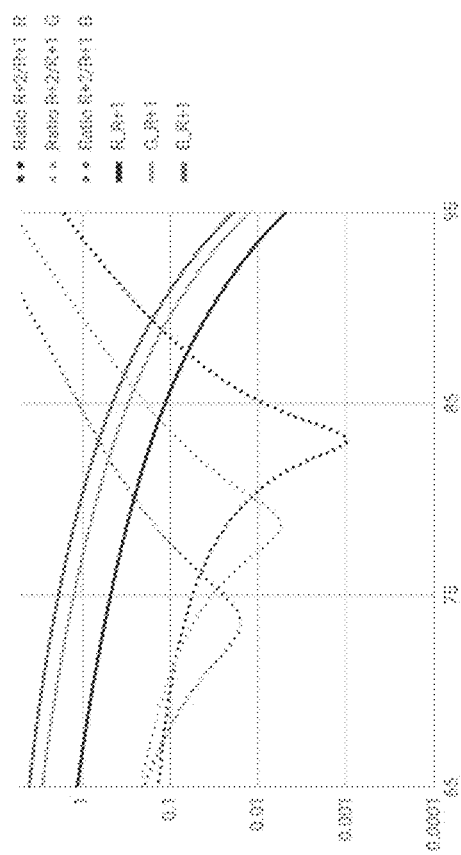
FIG. 6C is a fifth graph of data obtained for SRG outcouplers substantively similar to the SRG outcoupler from FIG. 4.

FIG. 6C is a fifth graph of data obtained for SRG outcouplers. FIG. 6C shows the ratio of second order diffraction efficiency divided by first order diffraction efficiency (R+2/R+1) (a unitless ratio) on the Y axis as a function of duty cycle (in %) on the X axis. (R+2/R+1) is depicted as dashed lines, while for the sake of comparison first order diffraction efficiency is depicted as solid lines, each value is depicted for red (R), green (G), and blue (B), wavelengths of light.

FIG. 6C shows that a duty cycle value of approximately 75% minimizes second order diffraction efficiency for red, green, and blue light while the first order diffraction efficiency is above at least 0.1% for red, green, and blue wavelengths of light.

Figures 7A, 7B, 7C:
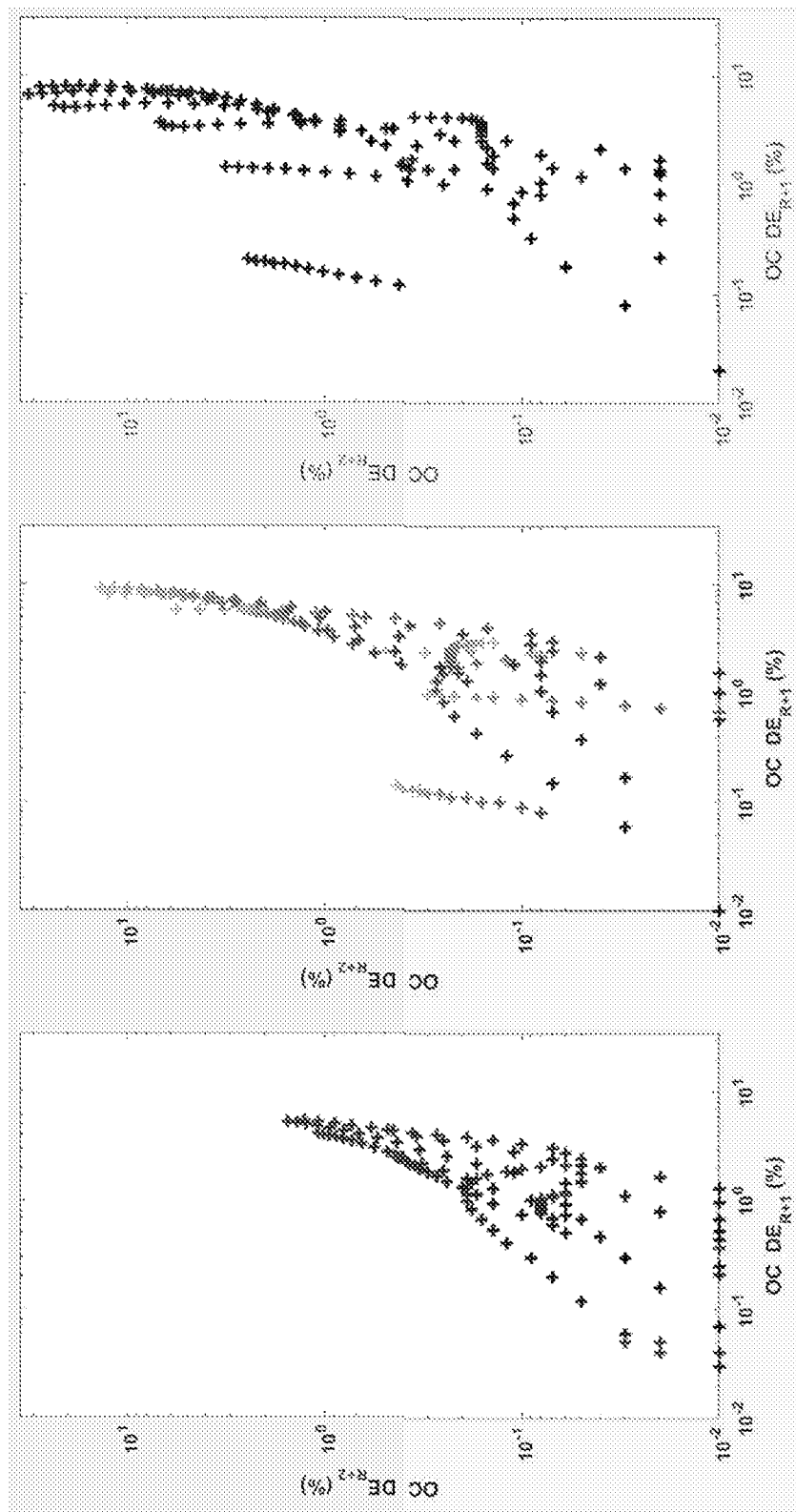
FIG. 7A is another graph of data obtained for SRG outcouplers substantively similar to the SRG outcoupler from FIG. 4.
FIG. 7B is another graph of data obtained for SRG outcouplers substantively similar to the SRG outcoupler from FIG. 4.
FIG. 7C is another graph of data obtained for SRG outcouplers substantively similar to the SRG outcoupler from FIG. 4.

FIG. 7A is another graph of data obtained for SRG outcouplers. FIG. 7A shows second order DE (OC $DE_{R+2}$) (in %) on the Y axis as a function of first order DE (OC $DE_{R+1}$) (in %) on the X axis for red wavelengths of light for various combinations of duty cycle and modulation height.

FIG. 7B is another graph of data obtained for SRG outcouplers. FIG. 7B shows second order DE (OC $DE_{R+2}$) (in %) on the Y axis as a function of first order DE (OC $DE_{R+1}$) (in %) on the X axis for green wavelengths of light for various combinations of duty cycle and modulation height.

FIG. 7C is another graph of data obtained for SRG outcouplers. FIG. 7AC shows second order DE (OC $DE_{R+2}$) (in %) on the Y axis as a function of first order DE (OC $DE_{R+1}$) (in %) on the X axis for blue wavelengths of light for various combinations of duty cycle and modulation height.

FIG. 7A, FIG. 7B, and FIG. 7C show that there exists a wide range of available values for second order DE and first order DE as modulation height and duty cycle are varied. In conventional lightguide design an outcoupler is typically designed to maximize first order DE for each wavelength; however, as illustrated herein the maximum available values of first order DE for each depicted wavelength of light show unacceptably high values for second order DE that can result in undesirable artifacts such as ghost images. In accordance with the present systems, devices, and methods, a combination of modulation height and duty cycle may be chosen that yields a moderately lower value for first order DE (i.e., sub-maximum) while providing a significant reduction in second order DE. That is, the undesirable effects of high second order DE may be mitigated by deliberately reducing the first order DE of an outcoupler.

Returning to FIG. 4, and considering the data presented above, a range of values for grating period 410, duty cycle 420, and modulation height 430 may therefore be chosen to minimize second order diffraction while still achieving an acceptable amount of first order diffraction. Grating period 410 may be in a range that is limited by the wavelength or wavelengths of light that will be outcoupled by SRG outcoupler 400, where grating period 410 cannot be less than half of the longest wavelength of light, nor greater than double the shortest wavelength of light.

In a first implementation, SRG outcoupler 400 may outcouple three wavelengths of light with wavelengths of about 450 nm, about 520 nm, and about 640 nm. A person of skill in the art will appreciate that precise wavelengths may vary in different implementations or even in different scenarios for the same implementation; therefore, the term "about" is used to here to allow some variability within +/−10%. Grating period 410 may be in a range of 320 nm to 900 nm, with a preferred range of 320 to 450 nm to decrease variation in diffraction efficiency as a function of wavelength. Modulation height 430 may be in a range of 20 to 100 nm. Duty cycle 420 may be in a range of 15 to 30%; in the alternative duty cycle 420 may be in a range of 65 to 95%. A first preferred range of modulation height of 50 to 100 nm and a first preferred range of duty cycle of 67 to 77% yield a value of first order diffraction efficiency greater than 0.1% with a significant reduction in second order diffraction efficiency.

A person of skill in the art will appreciate that the data presented above allows for additional implementations with values for modulation height 430 and duty cycle 420 that yield a first order DE that is at least a factor of 10 greater than the second order DE, thereby providing sufficiently high first order DE to outcouple light from a light guide as part of a WHUD while minimizing ghost image formation due to second order diffraction. So long as second order diffraction is held sufficiently low as to achieve negligible ghost image formation, a higher first order DE is typically preferred, however the conventional approach of maximizing first order DE may not only lead to ghost image formation due to second order diffraction, but also may not provide sufficient variability in first order DE to achieve constant exit pupil intensity by varying first order DE as a function of propagation distance through SRG outcoupler 400. Thus, while conventional lightguide design teaches controlling grating period 410, duty cycle 420, and modulation height 430 in order to maximize first order DE of an outcoupler (and thereby maximize the amount of light outcoupled by the outcoupler), the present systems, devices, and methods teach controlling grating period 410, duty cycle 420, and modulation height 430 in order to minimize (or at least, target a sufficiently low value for) second order DE of an outcoupler while still achieving a sufficiently high first order DE in order to minimize/reduce adverse effects such as ghost images while still achieving sufficient outcoupling.

A person of skill in the art will appreciate that the data presented in FIG. 5A, FIG. 5B, FIG. 5C, FIG. 6A, FIG. 6B, FIG. 6C, FIG. 7A, FIG. 7B, and FIG. 7C, may be employed to determine values for modulation height and duty cycle for a process to manufacture an outcoupler for use in a WHUD.

A person of skill in the art will appreciate that the various embodiments for exit pupil expansion in a curved lens with embedded light guide described herein may be applied in non-WHUD applications. For example, the present systems, devices, and methods may be applied in non-wearable heads-up displays and/or in other applications that may or may not include a visible display.

In some implementations, one or more optical fiber(s) may be used to guide light signals along some of the paths illustrated herein.

The WHUDs described herein may include one or more sensor(s) (e.g., microphone, camera, thermometer, compass, altimeter, and/or others) for collecting data from the user's environment. For example, one or more camera(s) may be used to provide feedback to the processor of the WHUD and influence where on the display(s) any given image should be displayed.

The WHUDs described herein may include one or more on-board power sources (e.g., one or more battery(ies)), a wireless transceiver for sending/receiving wireless communications, and/or a tethered connector port for coupling to a computer and/or charging the one or more on-board power source(s).

The WHUDs described herein may receive and respond to commands from the user in one or more of a variety of ways, including without limitation: voice commands through a microphone; touch commands through buttons, switches, or a touch sensitive surface; and/or gesture-based commands through gesture detection systems as described in, for example, U.S. Non-Provisional patent application Ser. No. 14/155,087, U.S. Non-Provisional patent application Ser. No. 14/155,107, PCT Patent Application PCT/US2014/057029, and/or U.S. Provisional Patent Application Ser. No. 62/236,060, all of which are incorporated by reference herein in their entirety.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet which are owned by Thalmic Labs Inc., including but not limited to: US Patent Publication No. US 2015-0378161 A1, U.S. Non-Provisional patent application Ser. No. 15/046,234, U.S. Non-Provisional patent application Ser. No. 15/046,254, U.S. Non-Provisional patent application Ser. No. 15/046,269, U.S. Provisional Patent Application Ser. No. 62/156,736, U.S. Provisional Patent Application Ser. No. 62/214,600, U.S. Provisional Patent Application Ser. No. 62/167,767, U.S. Provisional Patent Application Ser. No. 62/271,135, U.S. Provisional Patent Application Ser. No. 62/245,792, U.S. Non-Provisional patent application Ser. No. 14/155,087, U.S. Non-Provisional patent application Ser. No. 14/155,107, PCT Patent Application PCT/US2014/057029, U.S. Provisional Patent Application Ser. No. 62/236,060, and/or US Patent Application Publication No. US 2017-0068095 A1; US Patent Application Publication No. US 2017-0212290 A1; U.S. Provisional Patent Application Ser. No. 62/482,062; and U.S. Provisional Patent Application Ser. No. 62/534,099, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A surface relief grating-based outcoupler comprising:
a set of ridges having:
a grating period;
a duty cycle; and
a modulation height,
wherein the duty cycle and the modulation height are varied as a function of propagation distance along the outcoupler and provide:
a second order diffraction efficiency for the outcoupler that is less than or equal to a first target value; and
a first order diffraction efficiency for the outcoupler that is sub-maximal and greater than or equal to a second target value.

2. The outcoupler of claim 1 wherein the grating period minimizes a variation of a diffraction efficiency of the outcoupler as a function of wavelength.

3. The outcoupler of claim 1 wherein the grating period is greater than or equal to half of a longest wavelength of light to be outcoupled by the outcoupler, and wherein the grating period is less than or equal to two times a shortest wavelength of light to be outcoupled by the outcoupler.

4. The outcoupler of claim 1 wherein the first target value is a minimum value for the second order diffraction efficiency of the outcoupler, and wherein the duty cycle and the modulation height provide a second order diffraction efficiency for the outcoupler that is equal to the first target value.

5. The outcoupler of claim 1 wherein the outcoupler is operative to outcouple a red wavelength of light, a green wavelength of light, and a blue wavelength of light, and wherein the duty cycle and the modulation height provide:
a second order diffraction efficiency for the outcoupler that is less than or equal to the first target value for each of the red wavelength of light, the green wavelength of light, and the blue wavelength of light; and
a first order diffraction efficiency for the outcoupler that is sub-maximal and greater than or equal to the second target value for each of the red wavelength of light, the green wavelength of light, and the blue wavelength of light.

6. The outcoupler of claim 5 wherein the red wavelength of light is about 640 nm, the green wavelength of light is about 520 nm, and the blue wavelength of light is about 450 nm, and wherein:
the grating period is in a range of 320 nm-900 nm;
the duty cycle is in a range selected from a group consisting of: 15%-30% and 65%-95%; and
the modulation height is in a range of 20 nm-100 nm.

7. The outcoupler of claim 6 wherein the grating period is in a range of 320 nm to 450 nm, the duty cycle is in a range of 67%-77%, and the modulation height is in a range of 50 nm-100 nm.

8. The outcoupler of claim 1 wherein the outcoupler is operative to provide an optical power to light outcoupled thereby, the optical power to compensate for a curvature of an eye-side surface of a lens into which the outcoupler is to be embedded.

9. A lightguide comprising:
a volume of optically transparent material;
an incoupler carried by the volume of optically transparent material; and
an outcoupler carried by the volume of optically transparent material, wherein the outcoupler comprises:
a set of ridges having:
a grating period;
a duty cycle; and
a modulation height, wherein the duty cycle and the modulation height are varied as a function of propagation distance along the outcoupler and provide:
a second order diffraction efficiency for the outcoupler that is less than or equal to a first target value; and
a first order diffraction efficiency for the outcoupler that is sub-maximal and greater than or equal to a second target value.

10. The lightguide of claim 9 wherein the grating period minimizes a variation of a diffraction efficiency of the outcoupler as a function of wavelength.

11. The lightguide of claim 9 wherein the first target value is a minimum value for the second order diffraction efficiency of the outcoupler, and wherein the duty cycle and the modulation height provide a second order diffraction efficiency for the outcoupler that is equal to the first target value.

12. The lightguide of claim 9 wherein the outcoupler is operative to outcouple a red wavelength of light, a green wavelength of light, and a blue wavelength of light, and wherein the duty cycle and the modulation height provide:
a second order diffraction efficiency for the outcoupler that is less than or equal to the first target value for each of the red wavelength of light, the green wavelength of light, and the blue wavelength of light; and
a first order diffraction efficiency for the outcoupler that is sub-maximal and greater than or equal to the second target value for each of the red wavelength of light, the green wavelength of light, and the blue wavelength of light.

13. The lightguide of claim 12 wherein the red wavelength of light is about 640 nm, the green wavelength of light is about 520 nm, and the blue wavelength of light is about 450 nm, and wherein:
the grating period is in a range of 320 nm-900 nm;
the duty cycle is in a range selected from a group consisting of: 15%-30% and 65%-95%; and
the modulation height is in a range of 20 nm-100 nm.

14. The lightguide of claim 9 wherein the outcoupler is operative to provide an optical power to light outcoupled thereby, the optical power to compensate for a curvature of an eye-side surface of a lens into which the lightguide is to be embedded.

15. An eyeglass lens comprising:
a curved lens; and
a lightguide embedded in the curved lens, wherein the lightguide comprises:
a volume of optically transparent material;
an incoupler carried by the volume of optically transparent material; and
an outcoupler carried by the volume of optically transparent material, wherein the outcoupler comprises:
a set of ridges having:
a grating period;
a duty cycle; and
a modulation height, wherein the grating period, duty cycle, and the modulation height are varied as a function of propagation distance along the outcoupler and provide:
    a second order diffraction efficiency for the outcoupler that is less than or equal to a first target value; and
    a first order diffraction efficiency for the outcoupler that is sub-maximal and greater than or equal to a second target value.

16. The eyeglass lens of claim 15 wherein the grating period minimizes a variation of a diffraction efficiency of the outcoupler as a function of wavelength.

17. The eyeglass lens of claim 15 wherein the first target value is a minimum value for the second order diffraction efficiency of the outcoupler, and wherein the duty cycle and the modulation height provide a second order diffraction efficiency for the outcoupler that is equal to the first target value.

18. The eyeglass lens of claim 15 wherein the outcoupler is operative to outcouple a red wavelength of light, a green wavelength of light, and a blue wavelength of light, and wherein the duty cycle and the modulation height provides:
    a second order diffraction efficiency for the outcoupler that is less than or equal to the first target value for each of the red wavelength of light, the green wavelength of light, and the blue wavelength of light; and
    a first order diffraction efficiency for the outcoupler that is sub-maximal and greater than or equal to the second target value for each of the red wavelength of light, the green wavelength of light, and the blue wavelength of light.

19. The eyeglass lens of claim 18 wherein the red wavelength of light is about 640 nm, the green wavelength of light is about 520 nm, and the blue wavelength of light is about 450 nm, and wherein:
    the grating period is in a range of 320 nm-900 nm;
    the duty cycle is in a range selected from a group consisting of: 15%-30% and 65%-95%; and
    the modulation height is in a range of 20 nm-100 nm.

20. The eyeglass lens of claim 15 wherein the curved lens includes an eye-side surface having a curvature, and wherein the outcoupler is operative to provide an optical power to light outcoupled thereby, the optical power to compensate for the curvature of the eye-side surface of the curved lens.

* * * * *